United States Patent
Huberman et al.

(10) Patent No.: US 12,442,658 B2
(45) Date of Patent: Oct. 14, 2025

(54) DETERMINING MOTION IN INDOOR SPACE USING PROBABILISTIC REPRESENTATION OF MOTION TRANSITION

(71) Applicant: Mapsted Corp, Oakville (CA)

(72) Inventors: Sean Huberman, Guelph (CA); Ahmed Mahmood, Milton (CA); Vera Miller, Toronto (CA)

(73) Assignee: Mapsted Corp, Oakville (CA)

( * ) Notice: Subject to any disclaimer, the term of this patent is extended or adjusted under 35 U.S.C. 154(b) by 381 days.

(21) Appl. No.: 17/867,923

(22) Filed: Jul. 19, 2022

(65) Prior Publication Data

US 2024/0027223 A1 Jan. 25, 2024

(51) Int. Cl.
| | | |
|---|---|---|
| G01C 21/00 | (2006.01) | |
| G01C 21/20 | (2006.01) | |
| H04W 4/021 | (2018.01) | |
| H04W 4/33 | (2018.01) | |

(52) U.S. Cl.
CPC ........ *G01C 21/3811* (2020.08); *G01C 21/383* (2020.08); *H04W 4/021* (2013.01); *H04W 4/33* (2018.02)

(58) Field of Classification Search
CPC .............. G01C 21/3811; G01C 21/383; G01C 21/206; H04W 4/021; H04W 4/33
See application file for complete search history.

(56) References Cited

U.S. PATENT DOCUMENTS

| | | | | |
|---|---|---|---|---|
| 11,096,008 | B1* | 8/2021 | Batten | G01S 5/02523 |
| 11,153,720 | B1* | 10/2021 | Newton | H04W 24/02 |
| 2004/0203918 | A1* | 10/2004 | Moriguchi | G01C 21/26 455/456.1 |
| 2014/0120955 | A1* | 5/2014 | Padden | H04W 36/322 455/456.6 |
| 2014/0315575 | A1* | 10/2014 | Gupta | G01S 5/0236 455/456.1 |
| 2016/0018908 | A1* | 1/2016 | Forsblom | G01C 25/005 702/94 |
| 2016/0057639 | A1* | 2/2016 | Smith | H04W 64/003 455/423 |
| 2019/0212158 | A1* | 7/2019 | Gordon | G01C 21/3415 |
| 2022/0038846 | A1* | 2/2022 | Dawar | H04B 17/26 |

* cited by examiner

*Primary Examiner* — Harry H Kim
(74) *Attorney, Agent, or Firm* — Harshdeep Chawla

(57) ABSTRACT

A method and a device for determining motion of a device are described. In an example, a plurality of points-of-interest (POIs) are identified in a pedestrian area of an indoor space and, with each POI, a probabilistic representation of motion transition of a device from the POI is associated. The probabilistic representation of motion transition is indicative of a probability distribution of likely directions of motion that the device can exhibit from the POI. Further, a map of the indoor space is generated based on the association and the map is usable for ascertaining motion of the device in the indoor space.

20 Claims, 4 Drawing Sheets

400

```
┌─────────────────────────────────────────────────────────────────┐
│ IDENTIFYING A PLURALITY OF POINTS-OF-INTEREST (POIs) IN A       │
│ PEDESTRIAN AREA OF AN INDOOR SPACE                              │
│ 410                                                             │
└─────────────────────────────────────────────────────────────────┘
                              │
                              ▼
┌─────────────────────────────────────────────────────────────────┐
│ ASSOCIATING WITH EACH POI FROM AMONGST THE PLURALITY OF POIs, A │
│ PROBABILISTIC REPRESENTATION OF MOTION TRANSITION OF A DEVICE   │
│ FROM THE POI, WHEREIN THE PROBABILISTIC REPRESENTATION OF MOTION│
│ TRANSITION IS INDICATIVE OF A PROBABILITY DISTRIBUTION OF LIKELY│
│ DIRECTIONS OF MOTION THAT THE DEVICE CAN EXHIBIT FROM THE POI   │
│ 420                                                             │
└─────────────────────────────────────────────────────────────────┘
                              │
                              ▼
┌─────────────────────────────────────────────────────────────────┐
│ GENERATING A MAP OF THE INDOOR SPACE BASED ON THE ASSOCIATING   │
│ 430                                                             │
└─────────────────────────────────────────────────────────────────┘
                              │
                              ▼
┌─────────────────────────────────────────────────────────────────┐
│ ASCERTAINING MOTION OF THE DEVICE IN THE INDOOR SPACE BASED ON  │
│ THE GENERATED MAP                                               │
│ 440                                                             │
└─────────────────────────────────────────────────────────────────┘
```

FIG. 4

DETERMINING MOTION IN INDOOR SPACE USING PROBABILISTIC REPRESENTATION OF MOTION TRANSITION

TECHNICAL FIELD

The disclosure herein relates to the field of determining motion in an indoor space, for example, for the purposes of indoor navigation and localization of devices.

BACKGROUND

Location-based services are rapidly expanding as a ubiquitous service proposition. Outdoor location technologies are mainly based on GPS (Global Positioning System) technologies. At the same time, users of mobile devices have started to increasingly use and depend on indoor positioning and navigation applications and features. Particularly, indoor positioning and navigation of a mobile device carried or worn by a user can be difficult to achieve using satellite-based navigation systems, such as GPS, because the satellite-based navigation technology generally relies on the line-of-sight between the mobile device and the satellite. Accordingly, when the connection between the two becomes unavailable, or is only sporadically available, such as within enclosed, or partially enclosed, urban infrastructure and buildings, including hospitals, shopping malls, airports, university campuses and industrial warehouses, the positioning and navigational capability of the satellite-based navigation system becomes unreliable. In turn, indoor navigation and positioning solutions may rely on various sensors including accelerometers, gyroscopes, and magnetometers that may be commonly included in mobile phones and other computing devices, in conjunction with acquired wireless communication signal data to localize the mobile device. Thus, effectiveness of the indoor navigation and positioning solution is directly dependent on the quality of data, sensor or signal, and the manner of utilization of data for localization.

BRIEF DESCRIPTION OF THE DRAWINGS

FIG. 4 illustrates, as an example, a method for determining motion in indoor space using probabilistic representation of motion transition.

DETAILED DESCRIPTION

Figure 1:
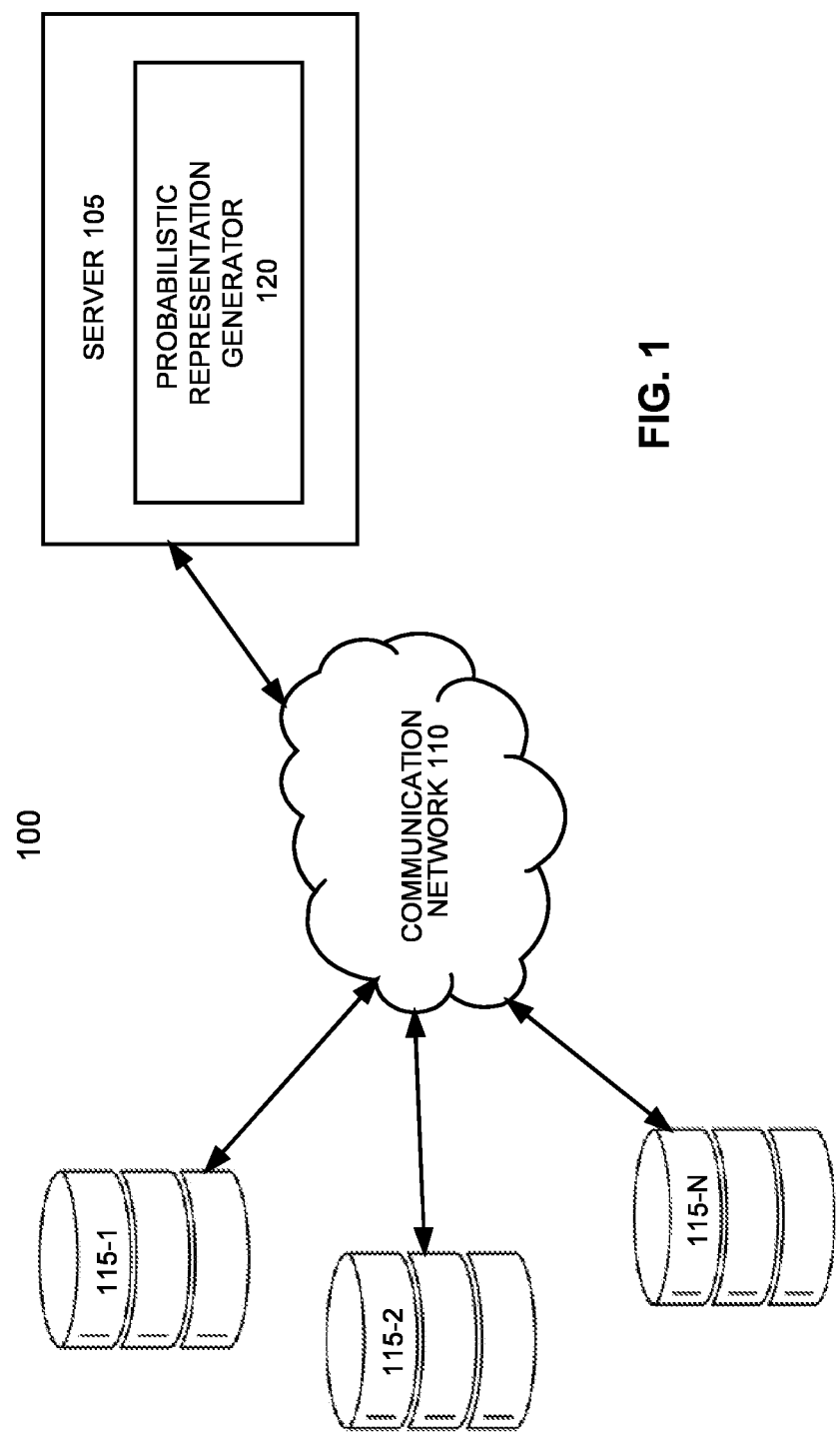
FIG. 1 illustrates, as an example, a network environment for determining motion in indoor space using probabilistic representation of motion transition.

Among other benefits and technical effects, embodiments provided herein provide for efficiently, effectively, and accurately determining motion of mobile devices in an indoor space, which can, as an example, be used for providing effective indoor-location based services to mobile devices in the indoor space. According to an aspect, the present subject matter involves representing the indoor space, for instance, a pedestrian area of the indoor space, as a probability map which indicates, at any given point in the indoor space, a probability of immediately imminent motion that can be exhibited by a device in the indoor space. In other words, the indoor space can have associated therewith a probability distribution of likely directions of motion that the device can exhibit inside the indoor space. As a result, the motion of the device inside the indoor space can be predicted with substantial accuracy which can allow for accurately representing the trajectory of the device as well as localizing the device. Therefore, as an example, the probability map of the indoor space may be used for initializing the device in the indoor space, i.e., initializing a position of the device prior to localization, or for validating and/or correcting the motion that has been determined or predicted without the probability map.

Recent technological advancements which allow the universally available smart mobile devices packing a variety of sensors for gathering data that is usable for positioning, has extended the reach of Indoor Positioning Systems (IPSs) as well as Indoor-location based services (ILBSs). Typically, the IPS uses sensorial data, such as that from inertial sensors and/or signal sensors, for location estimation in the indoor space. Usually, for localization of a mobile device in the indoor space, combination of the sensorial data is used in conjunction with various positioning techniques. For example, a trajectory of the mobile device can be estimated using the positioning techniques, which may use the sensorial data.

The data sensors may not always provide an accurate and reliable mode of estimation, mostly owing to the fact that the behavior of each type of sensor may vary in the indoor space depending on various factors, including environmental factors associated with the indoor space. In other words, owing to the nature of the sensor or the manner in which the sensorial data is generated, not all types of sensors may behave in a similar manner at all locations in the indoor space. For example, given the nature of magnetic field signals, magnetic field sensors may not be useful in locations where there are a number of other magnetic fields which can influence the magnetic field signals from the magnetic field sensors. In another example, received signal strength as data for use for localization may not be useful in certain locations owing to its attenuation characteristics. In another example, wiring and magnetic conductors in walls or pillars in the indoor space can impact the behavior of the sensorial data, for instance, behavior of the magnetic field sensor data, in the indoor space.

The situation is further convoluted when the indoor spaces vary such that each type of indoor space is characteristically different from the other. For example, an office indoor space has a fundamentally different structure and layout than a parking lot. Even within a certain family of indoor spaces or venues, such as shopping malls, the indoor environment may vary greatly and the indoor space may contain areas of unique environmental characteristics. For example, the indoor space, such as the shopping mall, may be made of long narrow hallways or pathways as well wide-open spaces, and may also include locations which have different elevations of the same location at different floors. Such common spatial features can impact the behavior of the sensorial data. For example, in narrow corridors, the presence of walls can reduce the spread in variation of motion data and, hence, the noise variance in determining orientation can be small. Alternatively, in wide corridors or open spaces, the noise variance can be large, which can cause substantial spread in variation of motion data. For instance, wireless signals can propagate freely in large open spaces, while indoor spaces having walls, furniture, obstacles, and user traffic may lead to poor signal propagation. Accordingly, wireless signal in the indoor space behave depending on the environment type and corresponding access point density, for instance, number of access points per floor.

However, the variations in the behavior of the sensorial data in the indoor spaces, as described above, can often have a considerable adverse influence in determining the trajectory of the device in the indoor space. In a typical IPS, the position of the device is determined from the sensorial data collected by the device sensors and the trajectory built on such sensorial data is, usually, error prone, with the amount of error, for instance, dependent on quality of the sensors. Additionally, such errors in the sensorial data may accrue over larger distances (referred to as drift) worsening the accuracy of indoor positioning. Conventionally, for correcting the trajectory, surrounding data sources, such as Wi-Fi, Global Positioning Signals, and Bluetooth, may be utilized. However, even with such correction, the determination of the position of the device in the indoor space may still be prone to error in a user's position. For example, in an indoor positioning system in which a blue dot on a digital map indicates a position of the device in the indoor space, when the device is positioned in the vicinity of an obstacle, such as a wall or a kiosk, or if the device is located in a tight space, it is likely that the computed trajectory of the device indicated on the digital map may pass through the obstacles, which clearly is impractical and erroneous.

Examples of the present subject matter are described herein which seek to address, inter alia, the above outlined deficiencies. The present subject matter is based on the principle that the knowledge of the direction of motion of the device may be particularly relevant for accurate and precise indoor positioning. According to an aspect, prior knowledge or predictive determination of the likely directions motion of the device at any point in an indoor space can assist in an accurate estimation of the trajectory of the device inside the indoor space. In turn, the accurate estimation of the trajectory of the device can facilitate rendering of efficient as well as accurate and effective indoor location-based services.

The present subject matter envisages a probabilistic approach to the determination of motion of the device inside the indoor space. According to an aspect, the indoor space, for instance, the pedestrian area of the indoor space, is represented as a probability map in which at various predefined points, a probability distribution of motion transition therefrom is determined and then associated with each of those points. This probability distribution of motion transition, referred to as a probabilistic representation of motion transition, associated with each point indicates the probability of the device to transition or move in various directions from that point. In other words, the probabilistic representation of motion transition indicates the likelihood of the device moving in a one or more directions from that point.

The probabilistic representation, as described above, may be associated with the entire indoor space, for specific sections, or for specific pre-defined points (referred to as points-of-interest (POIs). Accordingly, in one example, such POIs can be identified in the pedestrian area of the indoor space and the probabilistic representation of motion transition can be determined for each of the POIs. In another example, the indoor space may be divided into contiguous or non-contiguous constructional blocks and the probabilistic representation of motion transition can be determined for each of such constructional blocks. In said example, each such constructional block can have a definite number of POIs and, for each of such POIs within the constructional block, the probabilistic representation of motion transition can be determined.

In either of the cases above, the POIs can be identified by filling the indoor space or the constructional block, as the case may be, with a predefined number of equidistant points at which the probabilistic representation of motion transition is determined. For instance, the POIs inside the constructional block or the indoor space, in general, can be identified based on certain predefined criteria, such as locating the POIs at a predefined distance from the walls or obstacles inside the indoor space or the constructional block. In another instance, the POIs in the constructional block or the indoor space can be determined based on historical analytics data previously recorded for the indoor space and which can be indicative of the motion of devices in the indoor space or the constructional block, as the case may be. As another example, as is also explained in detail later, the POIs in the indoor space compared to those in each constructional block may be different. For instance, the POIs in the constructional block may have a high density whereas those in the indoor space may have a low density.

In one example, the constructional blocks can be tiles of a tessellated grid, for instance, made of polygonal tiles. In other words, each tile in the tessellated grid can be a constructional block. In another example, the indoor space can be divided into various zones, such as a narrow hallway, passageway, a floor transition section, and an open space, and each such zone can be a constructional block for which the probabilistic distribution of motion transition is determined. In yet another example, the constructional blocks can be a combination of the zone and tessellated grids. For instance, the indoor space can be divided into a plurality of zones and each zone can be further divided into a tessellated grid having multiple tiles. In such cases, as mentioned above, the probabilistic representation of motion transition of the device can be associated with each of the grids or zones, i.e., with each constructional block. Referring back to the above example regarding the density of POIs, within the tessellated grid, the density of the POIs can be higher than the density of the POIs in the constructional block and the constructional block, in turn, can have a higher density of POIs than the entire indoor space.

According to an aspect, as to the determining the probabilistic representation of motion transition of the device, the probabilistic representation of the motion transition can be determined based various factors including, in one example, the type of constructional block in which the probabilistic representation is determined. As mentioned above, as an example, the constructional block can be either the zone in which the indoor space is divided or can be a tile of the tessellated grid that is used to represent the area of the indoor space. In such an example, depending on the type of zone, the probability of the device's motion can be determined.

In another example, geometry of the constructional block, i.e., the zone or the tile, may be a factor that determines the probabilistic representation of motion transition in that constructional block. In the other case, where the probabilistic representation of motion transition is determined for the POIs in the indoor space or within the constructional block, the geometry surrounding the point-of-interest or in the vicinity of the POI. For instance, the probability of the device exhibiting immediate motion in a given direction is directly dependent on the closeness of the constructional block or the POI to a wall or any other obstacle. In a similar manner, a position of the POI or the constructional block in the indoor space as well as the neighboring constructional blocks or POIs can be factors which have a bearing on the probabilistic representation of motion transition of a constructional block or a POI, as the case may be.

Alternatively or additionally, the probabilistic representation of motion transition can be determined based on sensorial data collected from the indoor space, for instance, a constructional block or blocks or for the POIs, by a collection device. As an example, the sensorial data collected for the indoor space can be used to indicate at least of motion behavior of the collection device in the indoor space. For instance, the behavior of the collection devices over a period of time at a point or a constructional block can be used to determine the probability of motion transition for that point or for that constructional block in any given direction. For instance, machine learning techniques may be employed for the sensorial or behavioral data collected by the collection device, for extracting the probabilistic representation of motion transition for a given POI or constructional block. In one example, such determination of the probabilistic representation of motion transition based on the sensorial data can be used for fine tuning or carrying out corrective measures in the representations determined based on the various factors described previously. In other words, the two techniques for determining the probabilistic representation of motion transition can be used in combination with each other, for instance, for obtaining the probability representation using one technique and then introducing adjustments in that representation based on the other.

Further, the probabilistic representation of motion transition so associated with each POI or each constructional block in the indoor space can be used for generating a map of the indoor space which can be used for the purposes of ascertaining motion of devices in the indoor space. As an example, the probabilistic representation of motion transition may be a graphical representation overlaid or associated with the map of the indoor space. However, in other examples, the probabilistic representation of motion transition may simply be in the form of information, such as metadata, associated with the indoor space, without a graphical representation thereof.

As mentioned previously, the map of the indoor space associated with the probability values of motion transition, and referred to as a probability map of the indoor space, may be used for various purposes, including initializing the device in the indoor space, i.e., initializing a position of the device prior to localization, or for validating and/or correcting the motion that has been determined or predicted without the probability map. In case of initialization of the user position within a given region in the indoor space, the probabilistic representation of motion transition associated with that region can provide a probabilistic framework for representing the likelihood of movement of the device, and, hence, of a user, in a given direction based on the initialized location. As an example, a user walking through a hallway is likely to walk along the effective length of a hallway, rather than its much shorter width. In such a scenario, since the hallway is unidirectional, then the unidirectional motion is a natural fit to a device's expected trajectory, which is based on the sequence of immediate motion transitions performed by the device in the indoor space. Similarly, in another example, the probability map may be usable in real-time scenarios. For instance, when a user is walking through the indoor space, the probabilistic representation of motion transition can be used to predict or anticipate the likelihood of the user going in a certain direction. In addition or as an alternative, the probabilistic representation of motion transition can be used to validate that the user's motion as to whether it is consistent with the anticipated motion in the indoor space. Accordingly, such prediction of the motion transition can be used as a way of applying a correction to the user's motion, for instance, to improve the accuracy of prediction of the motion transition of the user in the indoor space in future. As an implementation, the techniques above of predicting, anticipating, determining, and correcting the motion can be used for, for example, localization of the device in the indoor space.

In the above example, if either the indoor space or the constructional block, as described above, is represented as a tessellated grid, in one example, such a tessellated grid may be a multi-layered, hierarchical grid made of polygons that cover the indoor space. In other words, the indoor space can be divided into a grid of polygonal tiles abutting adjacent polygonal tiles, i.e., having a tessellated structure, in a hierarchical arrangement, such that a polygonal tile higher in the hierarchical structure (referred to as patent tile) substantially covers two or more smaller polygonal tiles (referred to as child tiles) lower in the hierarchical structure. As explained above, the probabilistic representation of motion transition can be associated with each polygonal tile and across hierarchies. Each polygonal tile can have multiple POIs and the probabilistic representation of motion transition can be associated with each POI in each polygonal tile. In one example, at each hierarchical level, the density of POIs may vary such that the number of POIs and, hence, the density of the probabilistic representations in a tile in one hierarchical level may be different from those in the tile in another hierarchical level. For instance, the number of POIs in a parent tile may be the same as the number of POIs in each immediate child tile of that parent tile. In other words, at a lower hierarchical level, the same size of the block, i.e., equivalent to the size of the parent tile, may include greater number of POIs.

The polygonal tiles used for creating the tessellated grid may have various shapes and may be such that the polygonal tiles, when abutting together, can substantially fill the indoor space. In one example, the polygonal tiles may have a symmetrical polygonal shape, such as a symmetrical hexagonal shape. In another example, the polygonal tiles may have the same asymmetrical shape or have different symmetrical shapes. In yet another example, the polygonal tiles may be made of two or more different symmetrical shapes, in the same hierarchical level. In one more example, the polygonal tiles may be made of two or more different symmetrical shapes in different hierarchical levels. For instance, one hierarchical level can include a first set of polygonal tiles that are of a first symmetrical shape and another hierarchical level can include a second set of polygonal tiles that are of a symmetrical second shape, and a number of polygonal tiles in the lower hierarchical level are substantially contained in or cover a single polygonal tile of the set in the higher hierarchical level. For instance, the second set of tiles in the lower hierarchical level can be triangular tiles whereas the first set of tiles in the higher hierarchical level be hexagonal or rhombus-shaped. In addition, in the same example, in case the tiles in the lower hierarchical level are triangular, and the ones in the higher hierarchical level are rhombus-shaped, there may be a still higher hierarchical level which may have hexagonal tiles substantially containing within it the rhombus-shaped tiles as well as the triangular tiles of the lower hierarchical levels. For example, such a hierarchical structure can be embodied as a tree (or a tree-like) data structure, which can allow for an effective manner of retrieval of the probability data from the map of the indoor space.

Not only is the use of such a grid computationally viable, the grid-based representation of the probability of motion transition can improve system scalability. For instance, different indoor spaces may have different sizes, different geometries, and different amount of crowding or physical entities. By the provision of the hierarchical grid structure associated with the probabilistic representation of motion transition at each tile in the hierarchy, the grid-based map can be used to represent the probabilities in the indoor space at any resolution, i.e., selecting the granularity of the POIs in the indoor space. For example, for certain processes, a higher resolution of the grid can be selected in order to use that amount of detail of the probabilities in a given grid, whereas, for certain other processes, a lower resolution of the grid can be selected to make the processing lightweight.

Although the hierarchical structure, as envisaged by the present subject matter, has been described with the polygons higher in the hierarchy having a bigger size and smaller-sized polygonal tiles at lower levels of the hierarchy, any other manner of correlating the shapes and sizes of the polygonal tiles in the multiple layers may be implemented. For example, the hierarchy may be inverted and, instead, a larger polygonal tile may be lower in the hierarchy with respect to the smaller polygonal tiles.

Also provided herein is a computing device including a processor and a memory. In both, the instructions are executable in the processor to determine motion in the indoor space using probabilistic representation of motion transition as described above.

The terms localize, or localization, as used herein refer to determining a unique coordinate position of the mobile device at a specific location along a pedestrian route being traversed relative to the indoor area or building. In some embodiments, localization may also include determining a floor within the building, and thus involve determining not only horizontal planar (x, y) coordinates, but also include a vertical, or z, coordinate of the mobile device, the latter embodying a floor number within a multi-floor building, for example. In other embodiments, the (x, y, z) coordinates may be expressed either in a local reference frame specific to the mobile device, or in accordance with a global coordinate reference frame. In other examples, other forms of coordinates, such as spherical coordinates or polar coordinates may be used for spatially indicating the locations, as envisaged in the present subject matter.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processor and memory resources. For example, one or more embodiments described herein may be implemented, in whole or in part, on computing devices such as servers, desktop computers, mobile devices including cellular or smartphones, laptop computers, wearable mobile devices, and tablet mobile devices. Memory, processing, and network resources may all be used in connection with the establishment, use, or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage mobile devices, such as hard drives on personal computers or servers. Other examples of computer storage mediums include portable memory storage units, flash memory (such as carried on smartphones, multifunctional mobile devices or tablets), and magnetic memory. Computers, terminals, network enabled mobile devices (e.g., mobile devices, such as cell phones) are all examples of machines and mobile devices that utilize processors, memory, and instructions stored on computer-readable mediums. Additionally, embodiments may be implemented in the form of computer-programs, or a computer usable carrier medium capable of carrying such a program.

System Description

FIG. 1 illustrates, in an example embodiment, a system 100 for generating a map of an indoor space, the map having probabilistic representations of motion transition associated therewith. This probabilistic representation of motion transition can be a probability distribution of motion transition associated with the indoor space and can indicate the probability of a device to transition or move in various directions in the indoor space. In other words, the probabilistic representation of motion transition indicates the likelihood of the device moving in a one or more directions from various points in the indoor space. In an example, the indoor space can be space enclosed or partially enclosed within a shopping mall, an airport, a warehouse, a campus building, an office space, a stadium, a hospital, a parking lot, a university campus, or any other at least partially enclosed urban infrastructure or building. The system includes a server 105 and is communicatively connected via communication network 110 to a plurality of data sources 115-1 to 115-N (collectively referred to as data sources 115 and individually referred to as data source 115). Each data source 115 can include various types and formats of floor plans of different types of indoor spaces, in structured and unstructured formats.

As will be explained in detail later, in one example, the server 105 can employ the floor plans of the indoor space to determine the probabilities of motion transition inside the indoor space for generating the map of the indoor space. In another example, the server 105 implement machine-learning model(s) for generating the map of the indoor space. In such a scenario, the data sources 115 can provide the training data set for the machine-learning model(s) to be trained for generating the map of the indoor space. In said example, the server 105 can implement machine-learning techniques for generating the map of the indoor space. Further, the server 105 can include a probabilistic representation generator 120, referred to as PRG 120, hereinafter.

In operation, as an example, the server 105 can implement, as understood from above, a probabilistic approach to determine an imminent motion of the device at one or more points or regions inside the indoor space. According to an aspect, the server 105 can represent the indoor space, for instance, the pedestrian area of the indoor space, as a probability map showing a probability distribution of motion transition in the indoor space. This probability map can then be used for various purposes including initialization of devices inside the indoor space while performing localization or correction of motion transition inside the indoor space to more accurately predict the trajectories of the devices in the indoor space.

In one example, the PRG 120 can identify a plurality of points-of-interest (POIs) in the indoor space, for instance, in the pedestrian area of the indoor space and determine the probabilistic representation of motion transition for each of the POIs. In another example, the PRG 120 can divide the indoor space into contiguous or non-contiguous constructional blocks and determine the probabilistic representation of motion transition for each of such constructional blocks. In said example, the PRG 120 can identify, in each such constructional block, a definite number of POIs and can determine the probabilistic representation of motion transition for each of such POIs within the constructional block. In either case, the PRG 120 can fill the indoor space or the constructional block, as the case may be, with a predefined number of equidistant points at which the probabilistic representation of motion transition is determined, the equidistant points being the POIs. For example, the PRG 120 can identify the POIs inside the constructional block or the indoor space, in general, based on certain predefined criteria, such as locating the POIs at a predefined distance from the walls or obstacles inside the indoor space or the constructional block. In another example, the PRG 120 can determine the POIs in the constructional block or the indoor space based on historical analytics data previously recorded for the indoor space and which can be indicative of the motion of devices in the indoor space or the constructional block, as the case may be. For instance, the PRG 120 may derive the motion behavior of devices in the indoor space from reconstructed trajectories evaluated from analytics data aggregated over time for the indoor space, which analytics data can be used to determine the density or the position or both of the POIs in the indoor space or the constructional block.

In one example, the PRG 120 can divide the indoor space into a tessellated grid made up of multiple tiles as the constructional blocks. For instance, the PRG 120 can divide the indoor space into multiple polygonal tiles making the constructional blocks which abutting each other and form a continuous grid covering the indoor space. In another example, the PRG 120 can divide the indoor space into various zones, such as a narrow hallway, passageway, a floor transition section, and an open space, and each such zone can be a constructional block for which the probabilistic distribution of motion transition is determined.

In the above example, if either the indoor space or the constructional block, as described above, is represented as a tessellated grid, in one example, such a tessellated grid may be a multi-layered, hierarchical grid made of polygons that cover the indoor space. In other words, the indoor space can be divided into a grid of polygonal tiles abutting adjacent polygonal tiles, i.e., having a tessellated structure, in a hierarchical arrangement, such that a polygonal tile higher in the hierarchical structure (referred to as patent tile) substantially covers two or more smaller polygonal tiles (referred to as child tiles) lower in the hierarchical structure. As explained above, the probabilistic representation of motion transition can be associated with each polygonal tile and across hierarchies. Each polygonal tile can have multiple POIs and the probabilistic representation of motion transition can be associated with each POI in each polygonal tile. In one example, at each hierarchical level, the density of POIs may vary such that the number of POIs and, hence, the density of the probabilistic representations in a tile in one hierarchical level may be different from those in the tile in another hierarchical level. For instance, the number of POIs in a parent tile may be the same as the number of POIs in each immediate child tile of that parent tile. In other words, at a lower hierarchical level, the same size of the block, i.e., equivalent to the size of the parent tile, may include greater number of POIs.

The polygonal tiles used for creating the tessellated grid may have various shapes and may be such that the polygonal tiles, when abutting together, can substantially fill the indoor space. In one example, the polygonal tiles may have a symmetrical polygonal shape, such as a symmetrical hexagonal shape. In another example, the polygonal tiles may have the same asymmetrical shape or have different symmetrical shapes. In yet another example, the polygonal tiles may be made of two or more different symmetrical shapes, in the same hierarchical level. In one more example, the polygonal tiles may be made of two or more different symmetrical shapes in different hierarchical levels. For instance, one hierarchical level can include a first set of polygonal tiles that are of a first symmetrical shape and another hierarchical level can include a second set of polygonal tiles that are of a symmetrical second shape, and a number of polygonal tiles in the lower hierarchical level are substantially contained in or cover a single polygonal tile of the set in the higher hierarchical level. For instance, the second set of tiles in the lower hierarchical level can be triangular tiles whereas the first set of tiles in the higher hierarchical level be hexagonal or rhombus-shaped. In addition, in the same example, in case the tiles in the lower hierarchical level are triangular, and the ones in the higher hierarchical level are rhombus-shaped, there may be a still higher hierarchical level which may have hexagonal tiles substantially containing within it the rhombus-shaped tiles as well as the triangular tiles of the lower hierarchical levels. For example, such a hierarchical structure can be embodied as a tree (or a tree-like) data structure, which can allow for an effective manner of retrieval of the probability data from the map of the indoor space.

Not only is the use of such a grid computationally viable, the grid-based representation of the probability of motion transition can improve system scalability. For instance, different indoor spaces may have different sizes, different geometries, and different amount of crowding or physical entities. By the provision of the hierarchical grid structure associated with the probabilistic representation of motion transition at each tile in the hierarchy, the grid-based map can be used to represent the probabilities in the indoor space at any resolution, i.e., selecting the granularity of the POIs in the indoor space. For example, for certain processes, a higher resolution of the grid can be selected in order to use that amount of detail of the probabilities in a given grid, whereas, for certain other processes, a lower resolution of the grid can be selected to make the processing lightweight.

Although the hierarchical structure, as envisaged by the present subject matter, has been described with the polygons higher in the hierarchy having a bigger size and smaller-sized polygonal tiles at lower levels of the hierarchy, any other manner of correlating the shapes and sizes of the polygonal tiles in the multiple layers may be implemented. For example, the hierarchy may be inverted and, instead, a larger polygonal tile may be lower in the hierarchy with respect to the smaller polygonal tiles.

In yet another example, the PRG 120 can use a combination of the zone and tessellated grids to divide the indoor space into constructional blocks. In such an example, the PRG 120 can divide the indoor space into a plurality of zones and each zone can be further divided into a tessellated grid having multiple tiles. In such cases, as mentioned above, the PRG 120 can associate the probabilistic representation of motion transition of the device with each of the grids or zones, i.e., with each constructional block.

According to an aspect, the PRG 120 can select the size of the tile of the tessellated grid, while dividing the indoor space into constructional blocks in such a manner that the various points inside one tile have the same the probabilistic representation of motion transition associated therewith. In other words, the PRG 120 can divide the indoor space into constructional blocks, i.e., zones or tiles, for instance, based on continuous POIs associated with the same probabilistic representation of motion transition. Accordingly, as soon as the probability of motion transition changes, the PRG 120 demarcates that as the boundary of another zone or tile.

As mentioned previously, the PRG 120 can determine the probabilistic representation of motion transition of the device based on either the parameters associated with the indoor space or based on the behavior of devices inside the indoor space, or the PRG 120 may use a combination of the two. In the former case, the PRG 120 may determine the probabilistic representation based on various factors including, in one example, the PRG 120 can determine the probability of motion transition based on the type of constructional block, geometry of the constructional block or the geometry surrounding the points-of-interest or in the vicinity of the POIs, a position of the POI or the constructional block in the indoor space as well as the neighboring constructional blocks or POIs.

In the other scenario, the PRG 120 can determine the probabilistic representation of motion transition based on sensorial data collected from the indoor space, for instance, a constructional block or blocks or for the POIs, by a collection device (not shown). In an example, the sensorial data can be collected for the indoor space can be stored in the data source 115 and can be used by the PRG 120 to determine at least of motion behavior of the collection device in the indoor space. For instance, the behavior of the collection devices over a period of time at a point or a constructional block can be stored in the data source 115 and the PRG 120 can use this behavior determine the probability of motion transition for a POI or for a constructional block in any given direction. As mentioned previously, as an example, the PRG 120 can employ machine learning techniques and can determine for the collected sensorial or behavioral data for extracting the probabilistic representation of motion transition in the indoor space.

Further, the server 105 can use the probabilistic representation of motion transition so associated with each POI or each constructional block in the indoor space for generating a map of the indoor space. The map so generated, also referred to as the probability map, can be a graphical representation of the indoor space overlaid with the probabilistic representations of motion transition and can be used by the server 105 for the purposes of ascertaining motion of devices in the indoor space. In another example, the probability map may be in the form of information, such as metadata, associated with the indoor space, without a graphical representation thereof.

Figure 2:
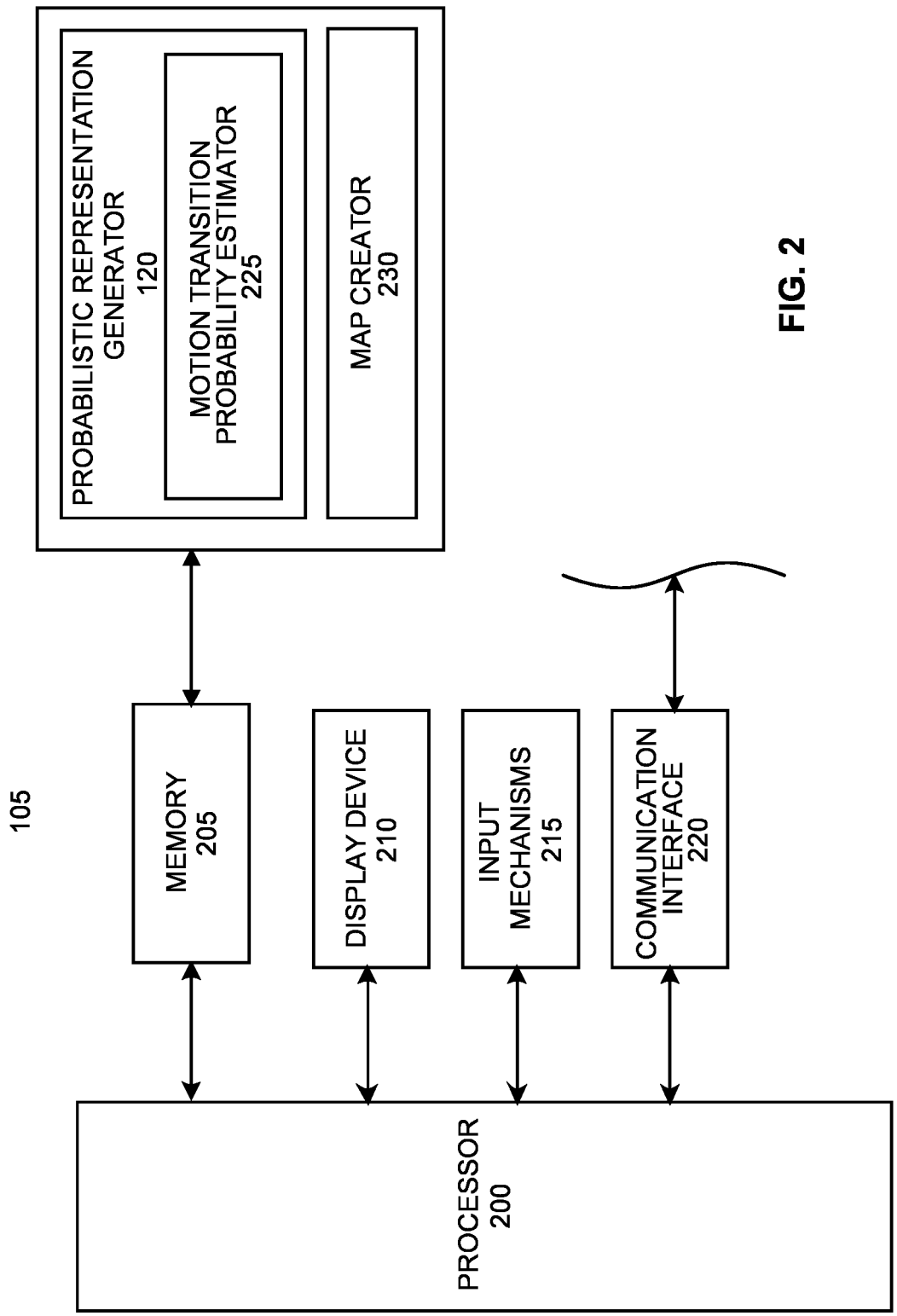
FIG. 2 illustrates, as an example, an architecture of a server computing device for determining motion in indoor space using probabilistic representation of motion transition.

FIG. 2 illustrates an example architecture of the server computing device 105, i.e., the server 105, for generating the map of the indoor space based on the associated probabilistic representations of motion transition. The server 105, in an embodiment architecture, may be implemented on one or more server devices, and includes processor 200, memory 205 which may include a read-only memory (ROM) as well as a random-access memory (RAM) or other dynamic storage device, display device 210, input mechanisms 215 and communication interface 220 for communicative coupling to communication network 104. Processor 200 is configured with software and/or other logic (such as from a trusted GPS logic module) to perform one or more processes, steps and other functions described with implementations, such as described by the figures herein. Processor 200 may process information and instructions stored in memory 205, such as provided by a random-access memory (RAM) or other dynamic storage device, for storing information and instructions which are executable by processor 200. Memory 205 also may be used for storing temporary variables or other intermediate information during execution of instructions to be executed by processor 200. Memory 205 may also include the ROM or other static storage device for storing static information and instructions for processor 200; a storage device, such as a magnetic disk or optical disk, may be provided for storing information and instructions. Communication interface 220 enables server 101 to communicate with one or more communication networks 104 (e.g., cellular network) through use of the network link (wireless or wired). Using the network link, server 101 can communicate with data recording devices 102.

The server 101 may include instructions stored in RAM of memory 205, and includes the PRG 120 having a motion transition probability estimator (MTPE) 225 and includes a map creator 230.

As explained above, the server 105 can generate the map for the indoor space by associating the probabilistic representations of motion transition with the indoor space, thereby creating the probability map of the indoor space. The server 105 can use the probability map to determine the motion of a device in the indoor space, for instance, by predicting the most probable direction of immediate motion transition of the device in the indoor space using the probability map.

According to an aspect, as to the determining the probabilistic representation of motion transition of the device, the MTPE 225 can determine the probabilistic representation of the motion transition based various factors including, in one example, the type of constructional block in which the probabilistic representation is determined. As mentioned above, as an example, the constructional block can be either the zone in which the indoor space is divided or can be a tile of the tessellated grid that is used to represent the area of the indoor space. In such an example, depending on the type of zone, the MTPE 225 can determine the probability of the device's motion in a given direction in the zone.

In another example, the MTPE 225 may take into account a geometry of the constructional block, i.e., the zone or the tile, to determine the probabilistic representation of motion transition in that constructional block. In the other case, where the probabilistic representation of motion transition is determined for the POIs in the indoor space or within the constructional block, the MTPE 225 may factor in the geometry surrounding the point-of-interest or in the vicinity of the POI while determining the probable directions of motion transition. For instance, the probability of the device exhibiting immediate motion in a given direction is directly dependent on the closeness of the constructional block or the POI to a wall or any other obstacle. In a similar manner, the MTPE 225 can consider a position of the POI or the constructional block in the indoor space as well as the neighboring constructional blocks or POIs as factors which have a bearing on the probabilistic representation of motion transition of a constructional block or a POI, as the case may be.

Alternatively or additionally, the MTPE 225 may determine the probabilistic representation of motion transition based on sensorial data collected from the indoor space, for instance, a constructional block or blocks or for the POIs, by a collection device. As mentioned previously, such data may be collected and stored in the data source 115 where the MTPE 225 can access the data and determine probability distribution of motion transition. Accordingly, the MTPE 225 can use the sensorial data collected for the indoor space to indicate at least of motion behavior of the collection device in the indoor space. In other words, the MTPE 225 can use the behavior of the collection devices over a period of time at a point or a constructional block to determine the probabilities of motion transition in various directions from that point or for that constructional block in any given direction.

According to an example, the MTPE 225 may employ machine learning techniques for the sensorial or behavioral data collected by the collection device, for extracting the probabilistic representation of motion transition for a given POI or constructional block. In one example, MTPE 225 may selectively apply different machine learning techniques for different scenarios to generate the skeletal map. For instance, the MTPE 225 can select the machine-learning technique to be employed from one of the Convolutional Neural Network-based (CNN-based) technique, the Graph Neural Network-based (GNN-based) technique, or the Generative Adversarial Network-based (GAN-based) technique, which can be further used for generating the map.

In one example, the MPTE 230 can use the probabilistic representation of motion transition obtained based on the sensorial data for fine tuning or carrying out corrective measures in the representations determined using the parameters associated with the indoor space as described above. In other words, the MTPE 230 can use the two techniques for determining the probabilistic representation of motion transition in tandem or in combination with each other, for instance, for obtaining the probability representation using one technique and then introducing adjustments in that representation based on the other.

In the examples above, the probabilistic representation of motion transition can be of two kinds—a directional magnitude type and a static type. For instance, the directional magnitude type can indicate or represent the probability distribution around the point with which the probabilistic representation of motion transition is associated. In other words, the probability or likelihood of the device moving in the various directions around the point is indicated by the directional magnitude type. On the other hand, the static type of probabilistic representation can have a fixed probability distribution around the point; however, an associated orientation of the probabilistic representation of motion transition can indicate the direction in which the probabilities are distributed around the point. In other words, the static type of probabilistic representation can have a separate orientation component associated therewith, whereas the directional magnitude type of probabilistic representation can include the orientation or direction integrated with the magnitude. In another example, in addition to the orientation, a scale may be associated with the probabilistic representation to indicate, for instance, a magnitude thereof. As an example, by applying a scale and/or orientation or rotation to the probabilistic representation, it can be used to indicate motion transition, for instance, based on a curvature of a particular region in the indoor space or change in the motion pattern owing to other factors, including the geometry and/or obstacles in the indoor space.

According to the latter example above in which the probabilistic representation of motion transition is represented as a static type, the probabilistic representation of motion transition can be one having a balanced probability, a skewed symmetric probability, a skewed asymmetric probability, a skewed unidirectional asymmetric probability, or a skewed non-unidirectional asymmetric probability. These various representations of the probabilistic motion transition can be used for representing the various possible motions that can be exhibited in the different parts of the indoor space and are shown, as an example, from FIG. 3A to 3E.

Figure 3E:
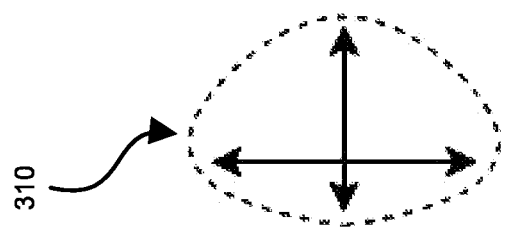
FIG. 3A-3E illustrate various examples of the probabilistic representations of motion transition.
Figure 3C:
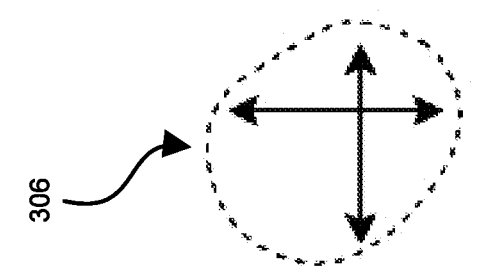
Figure 3D:
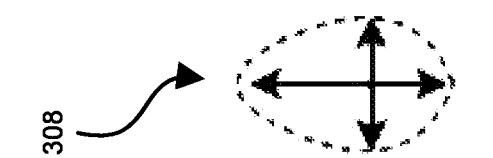
Figure 3B:
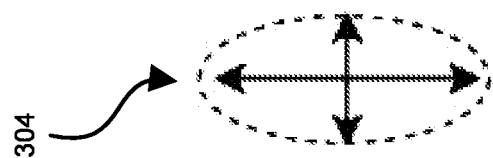
Figure 3A:
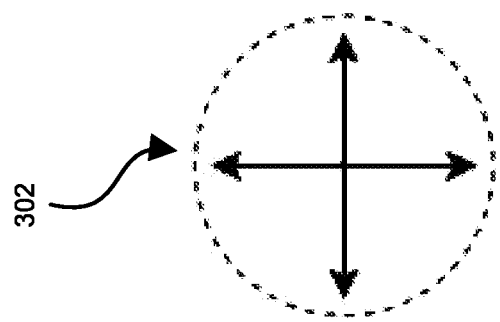

FIG. 3A illustrates the probabilistic representation of motion transition for balanced probability 302, as an example. For instance, the balanced probability 302 may indicate a substantially equal probability of motion transition in all directions. In other words, balanced probability 302 can be used for representing motion in spaces in which the probability of the device exhibiting the immediate motion is equal in all directions from a given point, such as in an open area or a lobby of the indoor space not restricted by any obstacles.

FIG. 3B illustrates the probabilistic representation of motion transition for skewed symmetric probability 304, as an example. In said example, the skewed symmetric probability 304 can indicate a relatively high probability of motion in two opposite directions and relatively low probability of motion in other directions. Such a representation can be used for indicating probabilistic motion transition in areas, such as narrow passages or a doorway, where the likelihood of immediate transition of motion of the device from a given point is in a straight line (opposite directions) and less likely to be sideways.

In the same manner, FIG. 3C illustrates the probabilistic representation of motion transition for skewed asymmetric probability 306, as an example. In said example, the skewed asymmetric probability 306 is used to indicate to relatively high probability of motion in two non-opposite directions and relatively low probability of motion in the other directions. For instance, the skewed asymmetric probability 306 is used for locations in the indoor space, such as corners, in which the device has a high probability of immediately transitioning from the point into a direction which is in the region between two substantially orthogonal directions but not in other directions.

FIG. 3D illustrates the probabilistic representation of motion transition for skewed unidirectional asymmetric probability 308, as an example. The skewed unidirectional asymmetric probability 308 indicates one of relatively high probability of motion in one direction and relatively low probability of motion in the other directions. In other words, as an example, the skewed unidirectional asymmetric probability 308 can be used to represent the motion transition in a region or at a point where the possibility of the device transitioning in motion in one direction is higher than in any other direction, for example, at the end of a narrow passageway where the most probably motion is away from the end of the narrow passageway.

Similar to above, FIG. 3E illustrates the probabilistic representation of motion transition for skewed non-unidirectional asymmetric probability 310, as an example. The skewed non-unidirectional asymmetric probability 310 can indicate a relatively low probability of motion in one direction and a relatively high probability of motion in other directions, i.e., opposite to the skewed unidirectional asymmetric probability 308, in a manner. Accordingly, the skewed non-unidirectional asymmetric probability 310 can be used to represent such parts or points of the indoor space, such as a wall of an open space, in which the possibility of the motion transition of the device is low in one direction (i.e., in the direction of the wall) but high in all other directions (i.e., all other directions away from the wall).

Further, the map creator 230 can use the probabilistic representation of motion transition so associated with each POI or each constructional block in the indoor space for generating a map of the indoor space. The map so generated, referred to as the probability map, can be a graphical representation of the indoor space overlaid with the probabilistic representations of motion transition and can be used by the server 105 for the purposes of ascertaining motion of devices in the indoor space. Further, as explained above, the probabilistic representations can also be graphical representations and, therefore, in such a case, the map creator 230 can generate the map of the indoor space as an integrated graphical representation showing the indoor space as well as the probabilistic representations, explained above with reference to FIGS. 3A-3E, as overlaid over the graphical image of the map. In another example, the probabilistic representations may be in the form of information, such as metadata, and, in such a case, the map creator 230 can generate the probability map in the form of such information associated with the indoor space, without a graphical representation thereof. However, as will be understood, in either case, the information represented by the probability map may be equally useful and may differ only in implementation, for example, between high processing-capability devices and low processing-capability devices.

As mentioned previously, the map of the indoor space associated with the probability values of motion transition, and referred to as a probability map of the indoor space, may be used for various purposes, including initializing the device in the indoor space, i.e., initializing a position of the device prior to localization, or for validating and/or correcting the motion that has been determined or predicted without the probability map. In case of initialization of the user position within a given region in the indoor space, the probabilistic representation of motion transition associated with that region can provide a probabilistic framework for representing the likelihood of movement of the device, and, hence, of a user, in a given direction based on the initialized location. As an example, a user walking through a hallway is likely to walk along the effective length of a hallway, rather than its much shorter width. In such a scenario, since the hallway is unidirectional, then the unidirectional motion is a natural fit to a device's expected trajectory, which is based on the sequence of immediate motion transitions performed by the device in the indoor space. Similarly, in another example, the probability map may be usable in real-time scenarios. For instance, when a user is walking through the indoor space, the probabilistic representation of motion transition can be used to predict or anticipate the likelihood of the user going in a certain direction. In addition or as an alternative, the probabilistic representation of motion transition can be used to validate that the user's motion as to whether it is consistent with the anticipated motion in the indoor space. Accordingly, such prediction of the motion transition can be used as a way of applying a correction to the user's motion, for instance, to improve the accuracy of prediction of the motion transition of the user in the indoor space in future. As an implementation, the techniques above of predicting, anticipating, determining, and correcting the motion can be used for, for example, localization of the device in the indoor space.

In the embodiments of the present subject matter, although the generation of the probability map of the indoor space, i.e., the map having probabilistic representations of motion transition associated therewith, is defined as being performed by the server 105, such generation may even be performed by a mobile computing device (not shown) or by the server 105 and the mobile computing device in combination. For instance, few pre-calculations can be performed on the server side and stored into efficient data structures, either at the server 105 or the mobile device, so that a minimalistic set of data is created which is readily available when needed by the mobile device, whether obtained from the server 105 or stored locally, for the generation of the probability map as described above.

Methodology

FIG. 4 illustrates, as an example, a method 400 for determining motion of devices in an indoor space. In describing FIG. 4, reference to the description and examples of FIGS. 1-3E should be understood to be part thereof for purposes of illustrating suitable components or elements for performing a step or sub-step being described and for the sake of brevity, the detailed operation of the components or elements has not been repeated herein and will be understood to be associated with the respective step or sub-step being described.

It will be appreciated that some of the method steps may be deleted, modified, or more steps may be added. Also, the steps are not limited by the order in which they are performed. Some of the steps may be performed simultaneously as well.

Referring to FIG. 4 examples of method steps described herein are techniques are performed by the processor 200 executing one or more sequences of software logic instructions that constitute the PRG 120, the TPE 225, and the map creator 230 of the server 105. In embodiments, the PRG 120, the TPE 225, and the map creator 230 may include the one or more sequences of instructions within sub-modules. Such instructions may be read into the memory 205 from machine-readable medium, such as memory storage devices. Execution of the sequences of instructions contained in the PRG 120, the TPE 225, and the map creator 230 in the memory 205 causes the processor 200 to perform the process steps described herein. It is contemplated that, in some implementations, some of the sub-modules, or any other portions of executable instructions constituting the components of the PRG 120, the TPE 225, and the map creator 230 may be hosted at a remote device. In alternative implementations, at least some hard-wired circuitry may be used in place of, or in combination with, the software logic instructions to implement examples described herein. Thus, the examples described herein are not limited to any particular combination of hardware circuitry and software instructions.

At block 410, a plurality of points-of-interest (POIs) can be identified, for instance, in the pedestrian area of the indoor space. In another example, the indoor space may be divided into contiguous or non-contiguous constructional blocks and each such constructional block can have a definite number of POIs In either of the cases above, the POIs can be identified by filling the indoor space or the constructional block, as the case may be, with a predefined number of equidistant points at which the probabilistic representation of motion transition is determined.

At block 420, a probabilistic representation of motion transition can be determined for each of the POIs and associated with the entire indoor space. The probabilistic representation can indicate the probability of the device to transition or move in various directions from that point. In other words, the probabilistic representation of motion transition indicates the likelihood of the device moving in a one or more directions from that point.

In an example, the probabilistic representation of motion transition can be determined based various factors including, in one example, the type of constructional block in which the POI lies. As an example, the constructional block can be either the zone in which the indoor space is divided or can be a tile of the tessellated grid that is used to represent the area of the indoor space. In such an example, depending on the type of zone, the probability of the device's motion can be determined. In another example, geometry of the constructional block, i.e., the zone or the tile, may be a factor that determines the probabilistic representation of motion transition in that constructional block. In the other case, where the probabilistic representation of motion transition is determined for the POIs in the indoor space or within the constructional block, the geometry surrounding the point-of-interest or in the vicinity of the POI. For instance, the probability of the device exhibiting immediate motion in a given direction is directly dependent on the closeness of the constructional block or the POI to a wall or any other obstacle. In a similar manner, a position of the POI or the constructional block in the indoor space as well as the neighboring constructional blocks or POIs can be factors which have a bearing on the probabilistic representation of motion transition of a constructional block or a POI, as the case may be.

Alternatively or additionally, the probabilistic representation of motion transition can be determined based on sensorial data collected from the indoor space, for instance, a constructional block or blocks or for the POIs, by a collection device. As an example, the sensorial data collected for the indoor space can be used to indicate at least of motion behavior of the collection device in the indoor space. For instance, the behavior of the collection devices over a period of time at a point or a constructional block can be used to determine the probability of motion transition for that point or for that constructional block in any given direction. For instance, machine learning techniques may be employed for the sensorial or behavioral data collected by the collection device, for extracting the probabilistic representation of motion transition for a given POI or constructional block. In one example, such determination of the probabilistic representation of motion transition based on the sensorial data can be used for fine tuning or carrying out corrective measures in the representations determined based on the various factors described previously. In other words, the two techniques for determining the probabilistic representation of motion transition can be used in combination with each other, for instance, for obtaining the probability representation using one technique and then introducing adjustments in that representation based on the other.

At block 430, a map of the indoor space can be generated using the associated probabilistic representation of motion generation for the indoor space.

Further, at block 440, after the generation of the map, the map can be used for ascertaining motion of the device in the indoor space by using the generated map.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method comprising:
    identifying a plurality of points-of-interest (POIs) in a pedestrian area of an indoor space, the plurality POIs being identified by filling the indoor space with a predefined number of points at which probabilistic representation of motion transition is determined;
    for each POI from amongst the plurality of POIs, associating with each POI a probabilistic representation of motion transition of a device from the POI, wherein the probabilistic representation of motion transition is indicative of a probability distribution of likely directions of motion that the device can exhibit from the POI, and wherein the associating comprises determining the probabilistic representation of motion transition of the device from the POI based on a geometry of a region of the POI in the indoor space, and a position of the POI in the indoor space and neighboring POIs;
    generating a map of the indoor space based on the associating; and
    ascertaining a probable motion of the device in the indoor space based on the generated map.

2. The method of claim 1, wherein the associating comprises determining an orientation of the probabilistic representation of motion transition at the POI with respect to the indoor space.

3. The method of claim 1, wherein the probabilistic representation of motion transition is one of:
    a balanced probability indicating a substantially equal probability of motion transition in all directions;
    a skewed symmetric probability indicating relatively high probability of motion in two opposite directions and relatively low probability of motion in other directions;
    a skewed asymmetric probability indicating relatively high probability of motion in two non-opposite directions and relatively low probability of motion in the other directions;
    a skewed unidirectional asymmetric probability indicating one of relatively high probability of motion in one direction and relatively low probability of motion in the other directions; and
    a skewed non-unidirectional asymmetric probability indicating a relatively low probability of motion in one direction and a relatively high probability of motion in other directions.

4. The method of claim 1, wherein the associating comprises determining the probabilistic representation of motion transition of the device from the POI is further based on:
sensorial data collected for the POI by a collection device, the sensorial data being indicative at least of a motion behavior of the collection device in a vicinity of the POI.

5. A method comprising:
dividing a pedestrian area of an indoor space, in a floor plan thereof, into a plurality of constructional blocks abutting each other, a constructional block comprising a plurality of POIs, the plurality of POIs being identified by filling the indoor space with a predefined number of points at which probabilistic representation of motion transition is determined;
for each constructional block from amongst the plurality of constructional blocks, associating with the constructional block a probabilistic representation of motion transition of a device in the constructional block, wherein the probabilistic representation of motion transition is indicative of a probability distribution of likely directions of motion that the device can exhibit in the constructional block, and wherein associating comprises determining the probabilistic representation of motion transition of the device from each POI based on a geometry of a region of the POI in the constructional block, and a position of the POI in the constructional block and neighboring POIs;
generating a map of the indoor space based on the associating; and
ascertaining a probable motion of the device in the indoor space based on the generated map.

6. The method of claim 5, wherein each of the plurality of constructional blocks is one of a tessellated grid, a zone, and a combination thereof, the associating comprising dividing the zone into a plurality of tessellated grids and correlating the probabilistic representation of motion transition of the device in each of the plurality of tessellated grids.

7. The method of claim 5, wherein the associating comprises determining an orientation of the probabilistic representation of motion transition within the constructional block.

8. The method of claim 5, wherein the probabilistic representation of motion transition is one of:
a balanced probability indicating a substantially equal probability of motion transition in all directions;
a skewed symmetric probability indicating relatively high probability of motion in two opposite directions and relatively low probability of motion in other directions;
a skewed asymmetric probability indicating relatively high probability of motion in two non-opposite directions and relatively low probability of motion in the other directions;
a skewed unidirectional asymmetric probability indicating one of relatively the other directions; and
a skewed non-unidirectional asymmetric probability indicating a relatively low probability of motion in one direction and a relatively high probability of motion in other directions,
wherein the associating comprising determining the probabilistic representation of motion transition of the device at a plurality of points-of-interest in the constructional block.

9. The method of claim 5, wherein the ascertaining the motion of the device comprises one of initializing the device in the indoor space, validating the ascertaining of the motion, and correcting the ascertaining of the motion.

10. The method of claim 5, wherein the associating comprises determining the probabilistic representation of motion transition of the device in the constructional block is further based on:
sensorial data collected for the POI by a collection device, the sensorial data being indicative at least of a motion behavior of the collection device in a vicinity of the POI.

11. A computing device comprising:
a processor; and
a memory storing a set of instructions, the instructions executable in the processor to:
identify a plurality of points-of-interest (POIs) in a pedestrian area of an indoor space, the plurality of POIs being identified by filling the indoor space with a predefined number of points at which probabilistic representation of motion transition is determined;
for each POI from amongst the plurality of POIs, associate with the POI a probabilistic representation of motion transition of a device from the POI, wherein the probabilistic representation of motion transition is indicative of a probability distribution of likely directions of motion that the device can exhibit from the POI, and wherein associating comprises determining the probabilistic representation of motion transition of the device from the POI based on a geometry of a region of the POI in the indoor space, and a position of the POI in the indoor space and neighboring POIs;
generate a map of the indoor space based on the associating; and
ascertain a probable motion of the device in the indoor space based on the generated map.

12. The computing device of claim 11 further comprising instructions executable in the processor to determine an orientation of the probabilistic representation of motion transition at the POI with respect to the indoor space.

13. The computing device of claim 11, wherein the probabilistic representation of motion transition is one of:
a balanced probability indicating a substantially equal probability of motion transition in all directions;
a skewed symmetric probability indicating relatively high probability of motion in two opposite directions and relatively low probability of motion in other directions;
a skewed asymmetric probability indicating relatively high probability of motion in two non-opposite directions and relatively low probability of motion in the other directions;
a skewed unidirectional asymmetric probability indicating one of relatively the other directions; and
a skewed non-unidirectional asymmetric probability indicating a relatively low probability of motion in one direction and a relatively high probability of motion in other directions.

14. The computing device of claim 11, further comprising instructions executable in the processor to determine the probabilistic representation of motion transition of the device from the POI is further based on:
sensorial data collected for the POI by a collection device, the sensorial data being indicative at least of a motion behavior of the collection device in a vicinity of the POI.

15. A computing device comprising:
a processor; and
a memory storing a set of instructions, the instructions executable in the processor to:
divide a pedestrian area of an indoor space, in a floor plan thereof, into a plurality of constructional blocks abutting each other, a constructional block comprising a plurality of POIs, the plurality of POIs being identified by filling the indoor space with a predefined number of points at which probabilistic representation of motion transition is determined;

for each constructional block from amongst the plurality of constructional blocks, associate with the constructional block a probabilistic representation of motion transition of a device in the constructional block, wherein the probabilistic representation of motion transition is indicative of a probability distribution of likely directions of motion that the device can exhibit in the constructional block, and wherein associating comprises determining the probabilistic representation of motion transition of the device from each POI based on a geometry of a region of the POI in the constructional block, and a position of the POI in the constructional block and neighboring POIs;

generate a map of the indoor space based on the associating; and ascertain motion of the device in the indoor space based on the generated map.

16. The computing device of claim 15, wherein each of the plurality of constructional blocks is one of a tessellated grid, a zone, and a combination thereof, the associating comprising dividing the zone into a plurality of tessellated grids and correlating the probabilistic representation of motion transition of the device in each of the plurality of tessellated grids.

17. The computing device of claim 15, further comprising instructions executable in the processor to determine an orientation of the probabilistic representation of motion transition within the constructional block.

18. The computing device of claim 15, wherein the probabilistic representation of motion transition is one of:
- a balanced probability indicating a substantially equal probability of motion transition in all directions;
- a skewed symmetric probability indicating relatively high probability of motion in two opposite directions and relatively low probability of motion in other directions;
- a skewed asymmetric probability indicating relatively high probability of motion in two non-opposite directions and relatively low probability of motion in the other directions;
- a skewed unidirectional asymmetric probability indicating one of relatively the other directions; and
- a skewed non-unidirectional asymmetric probability indicating a relatively low probability of motion in one direction and a relatively high probability of motion in other directions, wherein the associating comprising determining the probabilistic representation of motion transition of the device at a plurality of points-of-interest in the constructional block.

19. The computing device of claim 15 further comprising instructions executable in the processor to initialize the device in the indoor space, validate the ascertaining of the motion, and correct the ascertaining of the motion.

20. The computing device of claim 15 further comprising instructions executable in the processor to determine the probabilistic representation of motion transition of the device in the constructional block is further based on:
- sensorial data collected for the POI by a collection device, the sensorial data being indicative at least of a motion behavior of the collection device in a vicinity of the POI.

* * * * *